US012293516B2

(12) United States Patent
Hung et al.

(10) Patent No.: US 12,293,516 B2
(45) Date of Patent: May 6, 2025

(54) PULMONARY FUNCTION IDENTIFYING AND TREATING METHOD

(71) Applicant: BUDDHIST TZU CHI MEDICAL FOUNDATION, Hualien (TW)

(72) Inventors: Shih-Kai Hung, Chia-Yi (TW); Moon-Sing Lee, Chia-Yi (TW); Hon-Yi Lin, Chia-Yi (TW); Wen-Yen Chiou, Chia-Yi (TW); Liang-Cheng Chen, Chia-Yi (TW); Hui-Ling Hsieh, Chia-Yi (TW); Chih-Ying Yang, Chiayi (TW); Yin-Xuan Zheng, Chiayi (TW); Jing Xiang Wong, Chiayi (TW)

(73) Assignee: BUDDHIST TZU CHI MEDICAL FOUNDATION, Hualien (TW)

( * ) Notice: Subject to any disclaimer, the term of this patent is extended or adjusted under 35 U.S.C. 154(b) by 407 days.

(21) Appl. No.: 17/885,840

(22) Filed: Aug. 11, 2022

(65) Prior Publication Data

US 2023/0061960 A1 Mar. 2, 2023

(30) Foreign Application Priority Data

Aug. 19, 2021 (TW) ................................ 110130745

(51) Int. Cl.
*G06T 7/00* (2017.01)
*G06T 7/11* (2017.01)
*G06T 7/30* (2017.01)

(52) U.S. Cl.
CPC .............. *G06T 7/0012* (2013.01); *G06T 7/11* (2017.01); *G06T 7/30* (2017.01);
(Continued)

(58) Field of Classification Search
CPC ........ G06V 10/46; G06V 10/25; G06V 10/44; G06V 10/761; G06V 2201/07; G06T 7/70;
(Continued)

(56) References Cited

U.S. PATENT DOCUMENTS 7,668,357 B2   2/2010   Keall et al.
8,457,717 B2   6/2013   Keall et al.
(Continued)

OTHER PUBLICATIONS

"Tokihito Yamamoto et. al., Pulmonary Ventilation Imaging Based on 4-Dimensional Computed Tomography: Comparison With Pulmonary Function Tests and SPECT Ventilation Images, Oct. 2014, vol. 90, Issue 2, pp. 414-422" (Year: 2014).*
(Continued)

*Primary Examiner* — Chineyere Wills-Burns
*Assistant Examiner* — Phuong Hau Cai
(74) *Attorney, Agent, or Firm* — Muncy, Geissler, Olds & Lowe, P.C.

(57) ABSTRACT

A pulmonary function identifying and treating method includes: obtaining a first image, having first image elements, and a second image, having second image elements, respectively corresponding to a first state and a second state of a lung; extracting first feature points of the first image and second feature points of the second image; registering the first image with the second image using a boundary point set registration method and an inner tissue registration method according to the first feature points and the second feature points, so that the first image elements correspond to the second image elements and tissue units of the lung; determining functional index values representative of the tissue units of the lung using a ventilation function quantification method according to the first image elements and the second image elements corresponding to the first image elements;
(Continued)

and treating the lung according to the functional index values.

12 Claims, 18 Drawing Sheets

(52) U.S. Cl.
 CPC .............. *G06T 2207/10081* (2013.01); *G06T 2207/10088* (2013.01); *G06T 2207/30061* (2013.01)

(58) Field of Classification Search
 CPC ....... G06T 11/203; A61B 6/463; A61B 6/502; A61B 6/468; A61B 8/463; A61B 8/468; A61B 6/5217; A61B 6/12; A61B 8/5223; G16H 30/40; G16H 50/70; G16H 30/20; G16H 50/20
 See application file for complete search history.

(56) References Cited

U.S. PATENT DOCUMENTS

| | | | |
|---|---|---|---|
| 8,666,139 | B2 | 3/2014 | Zhang et al. |
| 8,731,255 | B2 | 5/2014 | El-Baz |
| 9,076,201 | B1 | 7/2015 | Negahdar et al. |
| 9,424,639 | B2 | 8/2016 | Jacob et al. |
| 9,943,703 | B2 | 4/2018 | Zhang et al. |
| 10,529,121 | B2 | 1/2020 | Forster et al. |
| 10,667,778 | B2 | 6/2020 | El-Baz et al. |
| 2019/0102893 | A1 | 4/2019 | Noji et al. |
| 2019/0183444 | A1 | 6/2019 | Castillo et al. |
| 2020/0178845 | A1 | 6/2020 | Castillo et al. |

OTHER PUBLICATIONS

"Nicholas K. Tustison et. al., Point Set Registration Using Havrda-Charvat-Tsallis Entropy Measures, Feb. 2011, vol. 30, Issue 2" (Year: 2011).*

"Thomas Guerrero et. al., Dynamic Ventilation Imaging from Four-Dimensional Computed Tomography, Jan. 2006, Physics in Medicine & Biology, Vo. 51, No. 4" (Year: 2006).*

"Jungwoon Cha et. al., Segmentation and Tracking of Lung Nodules via Graph-cuts Incorporating Shape Prior and Motion from 4D CT, Nov. 2017, Medical Physics, The International Journal of Medical Physics Research and Practice" (Year: 2017).*

"Guanglei Xiong et. al., Tracking the motion trajectories of junction structures in 4D CT images of the lung, Jul. 2012, Physics in Medicine & Biology, vol. 57, No. 15" (Year: 2012).*

Guerrero et al., "Dynamic ventilation imaging from four-dimensional computed tomography," Physics in Medecine and Biology, vol. 51 (2006) pp. 777-791, 16 pages.

Guerrero et al., "Quantification of Regional Ventilation from Treatment Planning CT," Int. J. Radiation Oncology Biol. Phys., vol. 62, No. 3, pp. 630-634, 2005, 5 pages.

Yamamoto et al., "The first patient treatment of computed tomography ventilation functional image-guided radiotherapy for lung cancer," Radiotherapy and Oncology 118 (2016) 227-231, 5 pages.

Yamamoto et al., "Pulmonary Ventilation Imaging Based on 4-Dimensional Computed Tomography: Comparison With Pulmonary Function Tests and SPECT Ventilation Images," Int J Radiation Oncol Biol Phys, vol. 90, No. 2, pp. 414-422, 2014, 9 pages.

M.D. Anderson Cancer Center, "4-Dimensional CT Derived Ventilation Versus SPECT Aerosol Ventilation in Patients With Thoracic Malignancies," Sep. 18, 2007, ClinicalTrials.gov Identifier: NCT00531180, 14 pages.

Billy W. Loo Jr., "4D-CT-based Ventilation Imaging for Adaptive Functional Guidance in Radiotherapy," Dec. 17, 2009, ClinicalTrials.gov Identifier: NCT01034514, 13 pages.

M.D. Anderson Cancer Center, "Imaging Study Compare 4DCT Image," Jun. 22, 2017, ClinicalTrials.gov Identifier: NCT01626001, 14 pages.

John M. Buatti, "A Study to Test Lung Function After Radiation Therapy (PFS)," Dec. 25, 2009, ClinicalTrials.gov Identifier: NCT01039649, 11 pages.

University of Wisconsin, Madison, "Improving Pulmonary Function Following Radiation Therapy," Jul. 26, 2016, ClinicalTrials.gov Identifier: NCT02843568, 16 pages.

University of Colorado, Denver, "A Novel Lung Function Imaging Modality as a Preoperative Evaluation Tool (LIME)," Feb. 8, 2018, ClinicalTrials.gov Identifier: NCT03426306, 13 pages.

H Lee Moffitt Cancer Center and Research Institute, "Pilot Study of Regional Lung Ventilation," Mar. 10, 2017, ClinicalTrials.gov Identifier:NCT03077113, 13 pages.

Kida et al., "CT ventilation functional image-based IMRT treatment plans are comparable to SPECT ventilation functional image-based plans," Radiotherapy and Oncology 118 (2016) 521-527, 7 pages.

Jensen et al., "Ventilation measured on clinical 4D-CBCT: Increased ventilation accuracy through improved image quality," Radiotherapy and Oncology 125 (2017) 459-463, 5 pages.

Huang et al., "Dosimetric feasibility of 4DCT-ventilation imaging guided proton therapy for locally advanced non-small-cell lung cancer," Radiation Oncology (2018) 13:78, 10 pages.

Vinogradskiy et al., "Using 4DCT-ventilation to characterize lung function changes for pediatric patients getting thoracic radiotherapy," Journal of Applied Clinical Medical Physics, Jun. 2018, 7 pages.

* cited by examiner

PULMONARY FUNCTION IDENTIFYING AND TREATING METHOD

CROSS-REFERENCE TO RELATED APPLICATIONS

This application claims priority of No. 110130745 filed in Taiwan R.O.C. on Aug. 19, 2021 under 35 USC 119, the entire content of which is hereby incorporated by reference.

BACKGROUND OF THE INVENTION

Field of the Invention

This disclosure relates to a pulmonary function identifying and treating method, and more particularly to a pulmonary function identifying and treating method of determining functional index values of tissue units of a lung according to a computed tomography (CT) image or CT images.

Description of the Related Art

Human lungs are vital organs of the respiratory system. However, the lung cancer remains the top in mortality of cancer deaths and has a high recurrence probability which increases the mortality. This makes the lung cancer one of the most lethal cancers among others. Radiation therapy is one of the most effective treatment methods for curing the cancer. The current radiation therapy treatment planning takes the lung as one single organ having a homogeneous function, but does not take the inhomogeneity of the lung function of different functional regions into account during therapy. Pulmonary function avoidance radiation therapy has been clinically proposed to possibly protect the regions having better pulmonary functions upon radiation therapy planning to reduce the side effects and retain chances for retreatment of lung cancer patients.

A pulmonary function analysis is the basis to implement pulmonary function avoidance. A current approach of pulmonary function analysis is a nuclear medicine pulmonary function examination, in which the patient needs to intake or be injected with a radioactive contrast agent so that the air flowing into the alveoli (ventilation) and the blood flowing into the alveoli (perfusion) are examined. At present, the clinically used pulmonary function analysis software processes partitions of the lung mainly according to two methods. The first method is to partition the lung into six large regions, and the second method is to partition the lung into five major lobes according to CT images. However, the nuclear medicine pulmonary function examination is intuitive and substantially performs the "qualitative analysis" or "large-region quantitative analysis." Therefore, a better method is currently needed to solve the above-mentioned problems.

BRIEF SUMMARY OF THE INVENTION

It is therefore an objective of this disclosure to provide a pulmonary function identifying and treating method of determining functional index values of tissue units of a lung according to a CT image or CT images. Another objective of this disclosure is to provide a pulmonary function identifying and treating method adopting a deformable image registration method and a pulmonary ventilation functional analysis method.

To achieve the above-identified objective, this disclosure provides a pulmonary function identifying and treating method including steps of: obtaining a first image, having first image elements, and a second image, having second image elements, respectively corresponding to a first state and a second state of a lung; extracting first feature points of the first image and second feature points of the second image; registering the first image with the second image using a boundary point set registration method and an inner tissue registration method according to the first feature points and the second feature points, so that the first image elements correspond to the second image elements and tissue units of the lung; and determining functional index values representative of the tissue units of the lung using a ventilation function quantification method according to the first image elements and the second image elements corresponding to the first image elements.

With the above-mentioned embodiment, functional index values of inner tissue units of the lung can be calculated according to medical images, so that the patient is free from the radiation dosage for the nuclear medicine pulmonary function examination, and the result with the resolution higher than that of the nuclear medicine examination can be obtained for radiation therapy planning.

In order to make the above-mentioned content of this disclosure more obvious and be easily understood, preferred embodiments will be described in detail as follows in conjunction with the accompanying drawings.

DETAILED DESCRIPTION OF THE INVENTION

An embodiment of this disclosure mainly provides a pulmonary function identifying and treating method of determining functional index values representative of tissue units of a lung or lungs according to a CT image or CT images. In one example, a deformable image registration method and a pulmonary ventilation functional analysis method can be adopted to calculate the functional index values of the inner tissue units of the lung according to the CT image(s). Because the lung deforms non-linearly during respiration, the deformable image registration method is needed to register an image of a first state (e.g. an inhale phase, and more particularly a maximum inhale phase) of the lung with an image of a second state (e.g., an exhale phase, and more particularly a maximum exhale phase) of the lung, and to determine displacement relationships between the inner tissue units of the lung for registration. Then, the functional analysis on each inner tissue unit can be performed after the registration.

The registration method is a two-stage image registration method incorporating with feature points. First, feature points can be extracted from two three-dimensional computed tomography (3D-CT) images corresponding to the maximum inhale phase and the maximum exhale phase according to a four-dimensional computed tomography (4D-CT) image, wherein 3D refers to three dimensional, and 4D refers to four dimensional. Then, the two images are registered with each other according to a coherent point drift (CPD) method and a Demons image registration method to determine the difference between HU values of the same inner tissue unit of the lung in the two phases. Next, the difference between the HU values is analyzed and further quantified to obtain the ventilation (functional index value) of the inner tissue unit of the lung, so that the patient is free from the radiation dosage for the clinical nuclear medicine pulmonary function examination.

Figure 1:
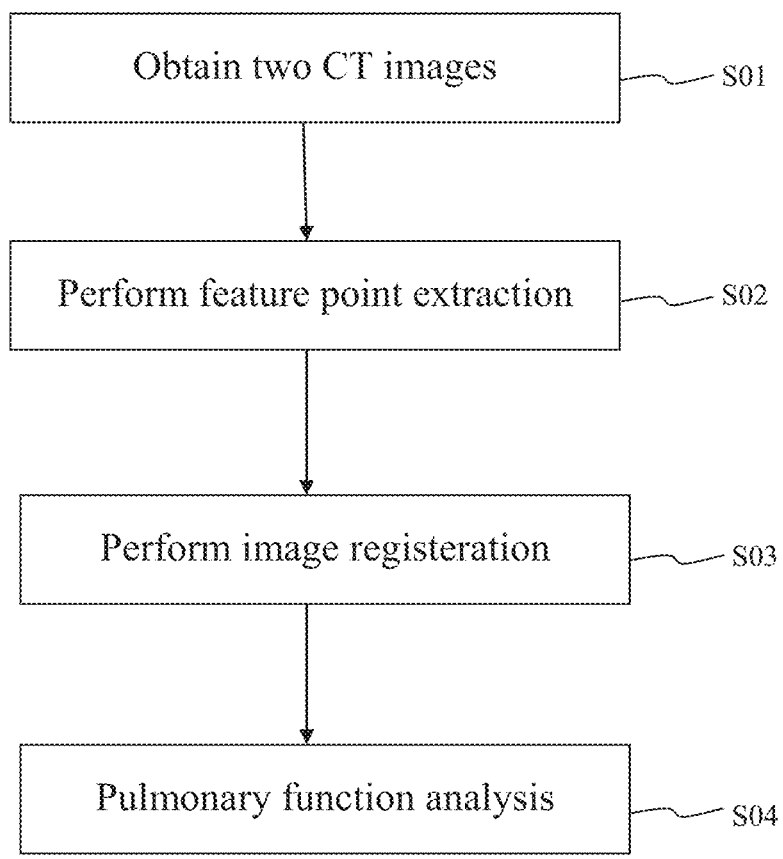
FIG. 1 is a flow chart showing a pulmonary function identifying method according to a preferred embodiment of this disclosure.

FIG. 1 is a flow chart showing a pulmonary function identifying method according to a preferred embodiment of this disclosure. Referring to FIG. 1, the pulmonary function identifying method includes steps S01 to S04, and may be presented in the form of program codes stored in a data medium of a computer program or a network server. The pulmonary function identifying method may be executed in the computer, which includes, for example but without limitation to, a server, a desktop computer, a notebook computer, a tablet computer, a dedicated machine or a mobile device, to provide an interface for guiding an operator to operate, or to automatically perform the corresponding operations.

Figure 2:
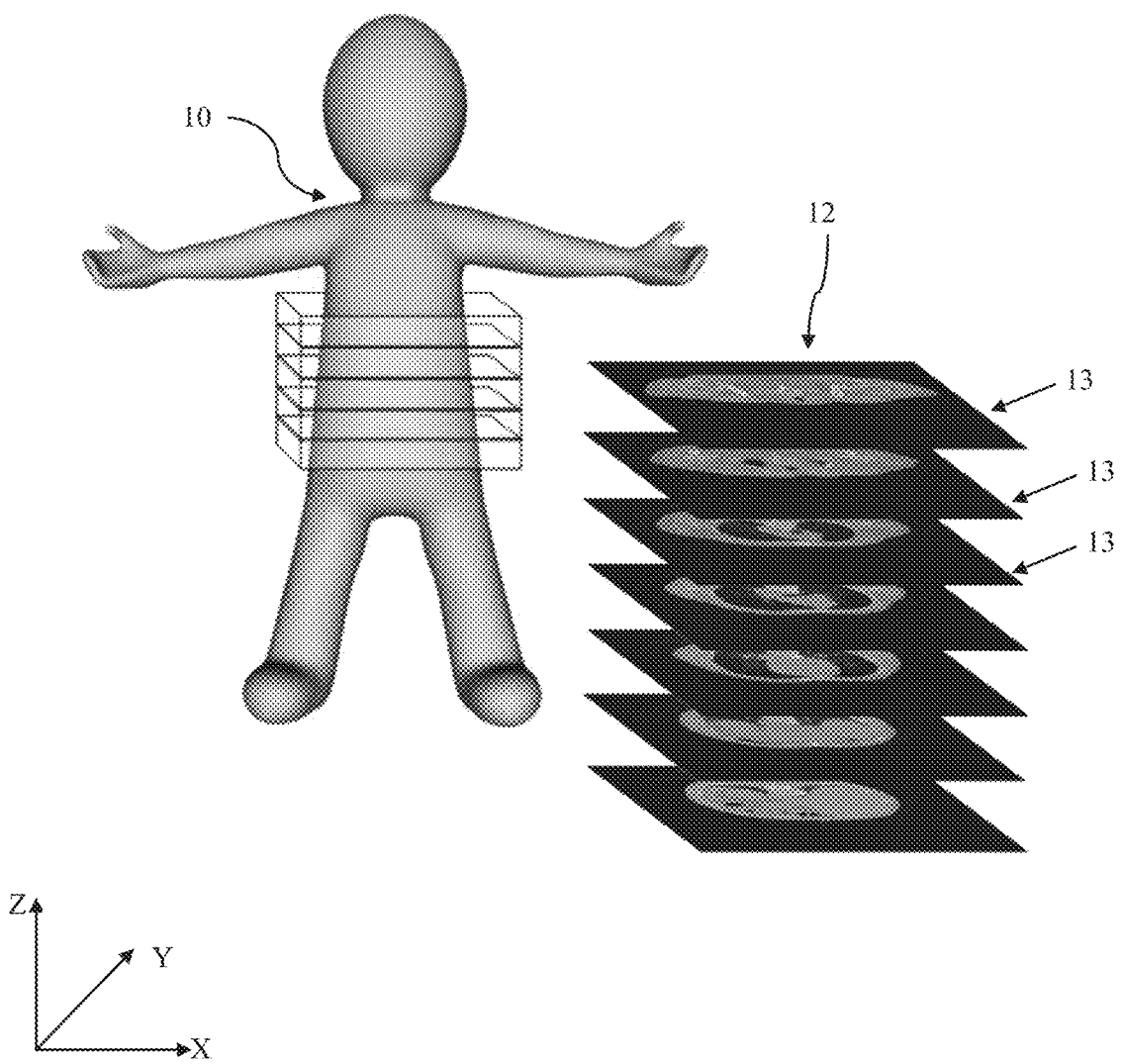
FIG. 2 is a schematic view showing computed tomography.

Regarding the radiation therapy planning, the 4D-CT image(s) may be used to evaluate the tumor movement range and make the treatment planning. Therefore, a good solution should be provided based on the 4D-CT pulmonary function analysis. FIG. 2 is a schematic view showing computed tomography. Referring to FIG. 2, a CT scanner performs computed tomography on a human body 10 to obtain one or multiple 4D-CT images. The 4D-CT image includes 3D-CT images 12 corresponding to respiration phases, wherein FIG. 2 only depicts one 3D-CT image 12 corresponding to one respiration phase. The 3D-CT image 12 has multiple 2D-CT images 13, which are disposed on planes parallel to the X-Y plane, and can be stacked in the Z-axis direction to constitute the 3D-CT image 12. In the following figures, the X-axis represents the pixel number, the Y-axis represents the pixel number, the X-Y plane represents the cross section (horizontal section) of the human body, and the Z-axis represents the cross-section number of the horizontal section of the human body. In another example, it is not necessarily to perform processing using the 4D-CT image because 3D-CT or 2D-CT images of the inhale and exhale phases can be obtained and processed. If the 3D-CT images are processed, the 3D functional index values can be obtained. If the 2D-CT images are processed, the 2D functional index values can be obtained. Although the 3D-CT images are processed in the following example, this disclosure is not restricted thereto. The processing of the 3D-CT images is also applicable to the processing of the 2D-CT images except for the stacking in the Z-axis direction. The CT images may be obtained by using or not using a developer, so that this disclosure is not particularly restricted thereto.

Figure 3A:
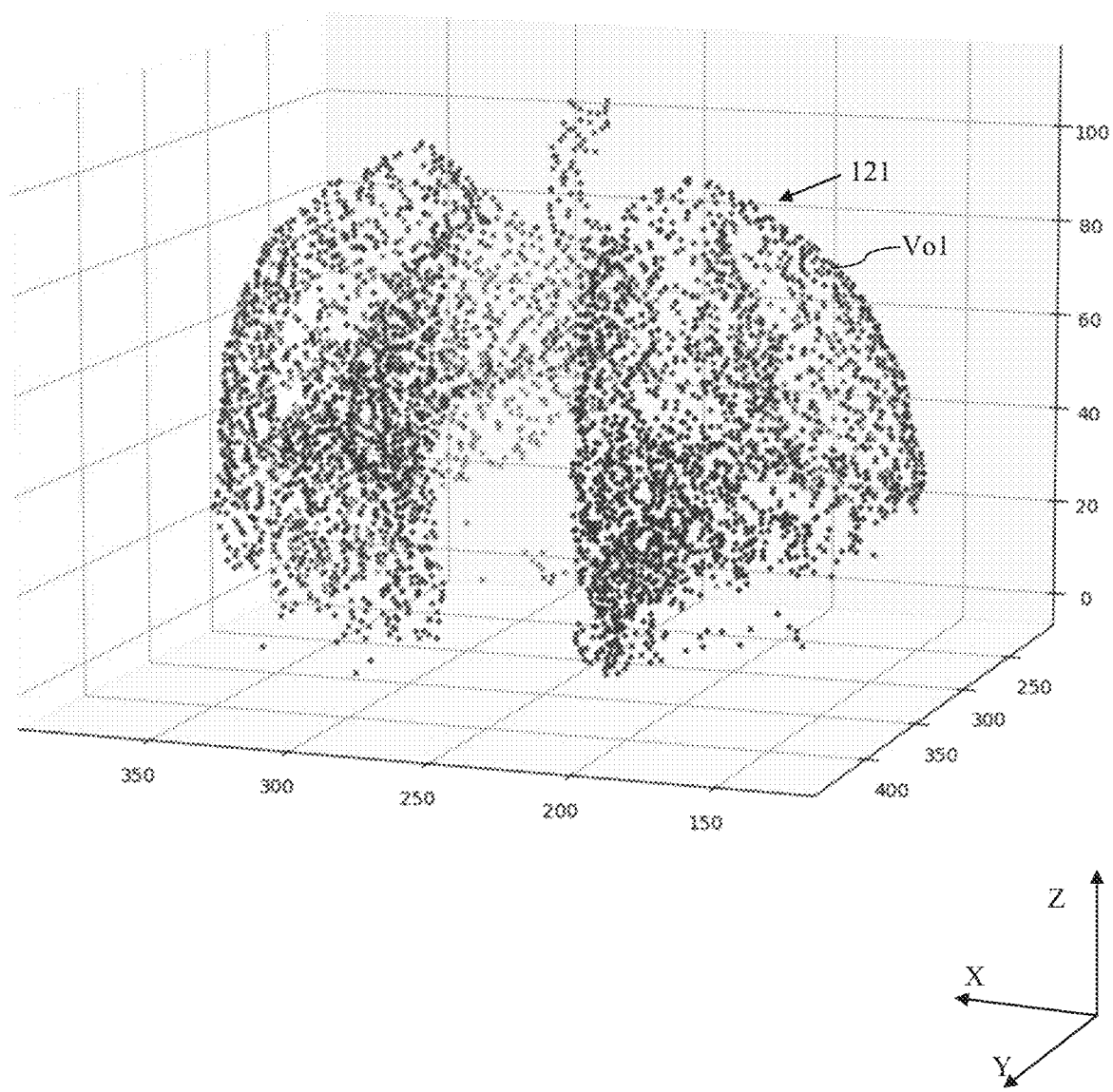
FIGS. 3A and 3B show a first 3D contour feature point set and a second 3D contour feature point set, respectively.
Figure 3B:
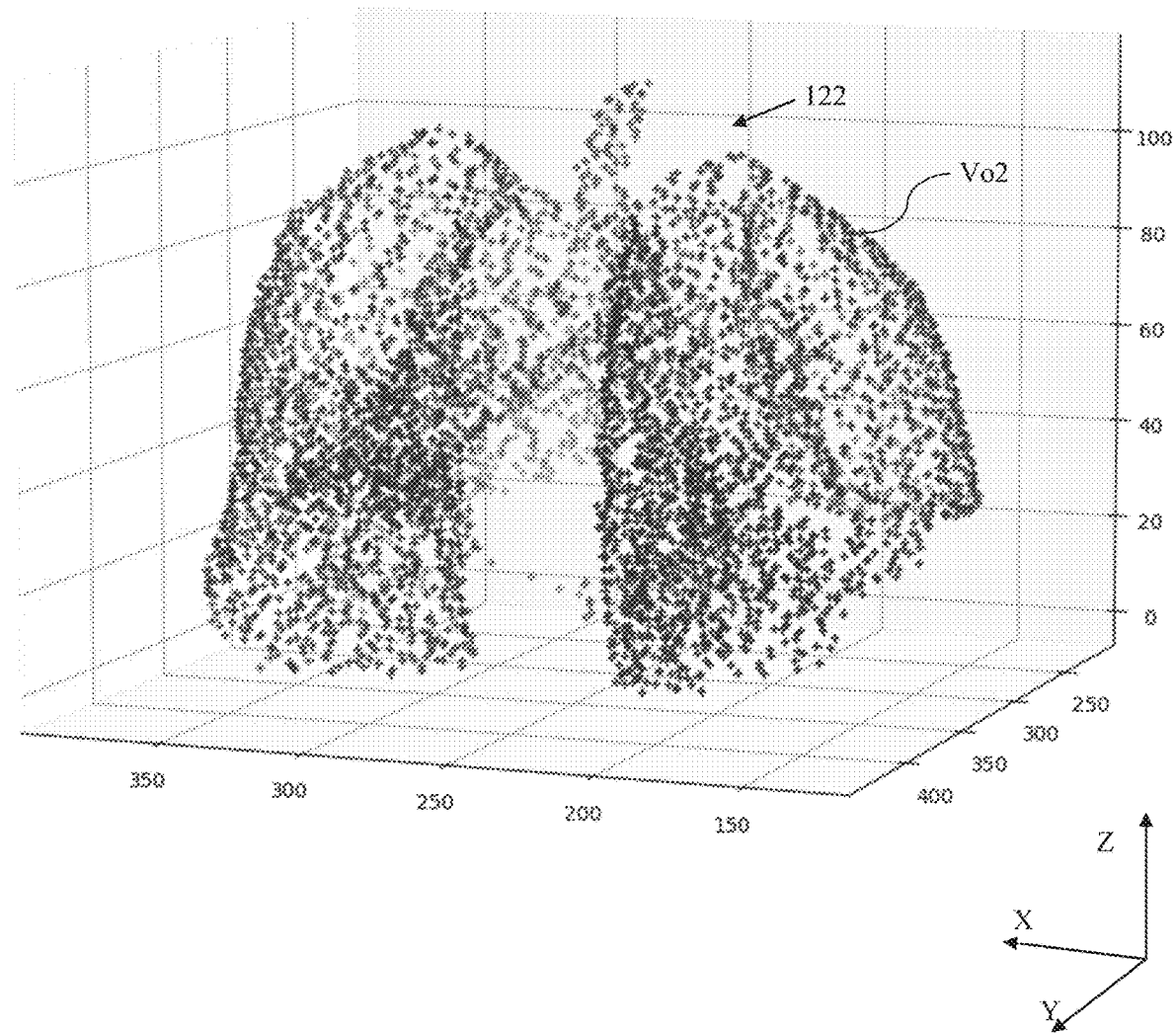

FIGS. 3A and 3B show a first 3D contour feature point set and a second 3D contour feature point set, respectively. Referring to FIGS. 1 to 3B, in the step S01, two CT images are obtained. In one example, a first CT image and a second CT image respectively corresponding to the inhale phase and the exhale phase of the human lung(s) are obtained, wherein the first CT image may be, for example, a first 3D-CT image, and may be imagined as the 3D-CT image 12 of the inhale phase of FIG. 2, which is post-processed into a contour feature point set 121; and the second CT image may be, for example, a second 3D-CT image, and may be imagined as the 3D-CT image 12 of the exhale phase of FIG. 2, which is post-processed into a contour feature point set 122. Because the contour feature point set is established using voxels, the first 3D-CT image may be regarded as having multiple first voxels Vo1 indicated by dots, wherein other voxels not pertaining to the feature points are not depicted; and the second 3D-CT image may be regarded as having multiple second voxels Vo2 indicated by cross points, wherein other voxels not pertaining to the feature points are not depicted. When the 2D image in the vertical or horizontal cross section is considered, the voxels may be regarded as pixels. In the following, the voxels are explained as examples. Because applications to the 2D images and 3D images are possible, the voxel and pixel may be regarded as an image element or image unit. Next, in the steps S02 to S04, the functional index values of the tissue units of the lung(s) are determined according to the CT images, wherein the details will be described later, and the CT image may be the 2D-CT, 3D-CT or 4D-CT image. In one example, the 4D-CT image of the lung may be imported into the computer, which performs judgement according to the 4D-CT image of the lung to obtain the first 3D-CT image and the second 3D-CT image. The first 3D-CT image corresponds to the inhale phase (preferably the maximum inhale phase) of the lung, while the second 3D-CT image corresponds to the exhale phase (preferably the maximum exhale phase) of the lung. In another example, the computer can provide several interfaces, through which the operator can artificially pick up the first 3D-CT image and the second 3D-CT image from the 4D-CT image. In still another example, the patient can hold his/her breath in the inhale and exhale phases, and the first 3D-CT image and the second 3D-CT image can be obtained, respectively. Because the lung deforms during respiration, two images having differences that can be identified are preferably required, and the images before and after deformation are registered with each other to determine the corresponding relationship between voxels of the two images. Because the lung deforms, the number of the first voxels Vo1 is different from the number of the second voxels Vo2 in principle.

Figure 3C:
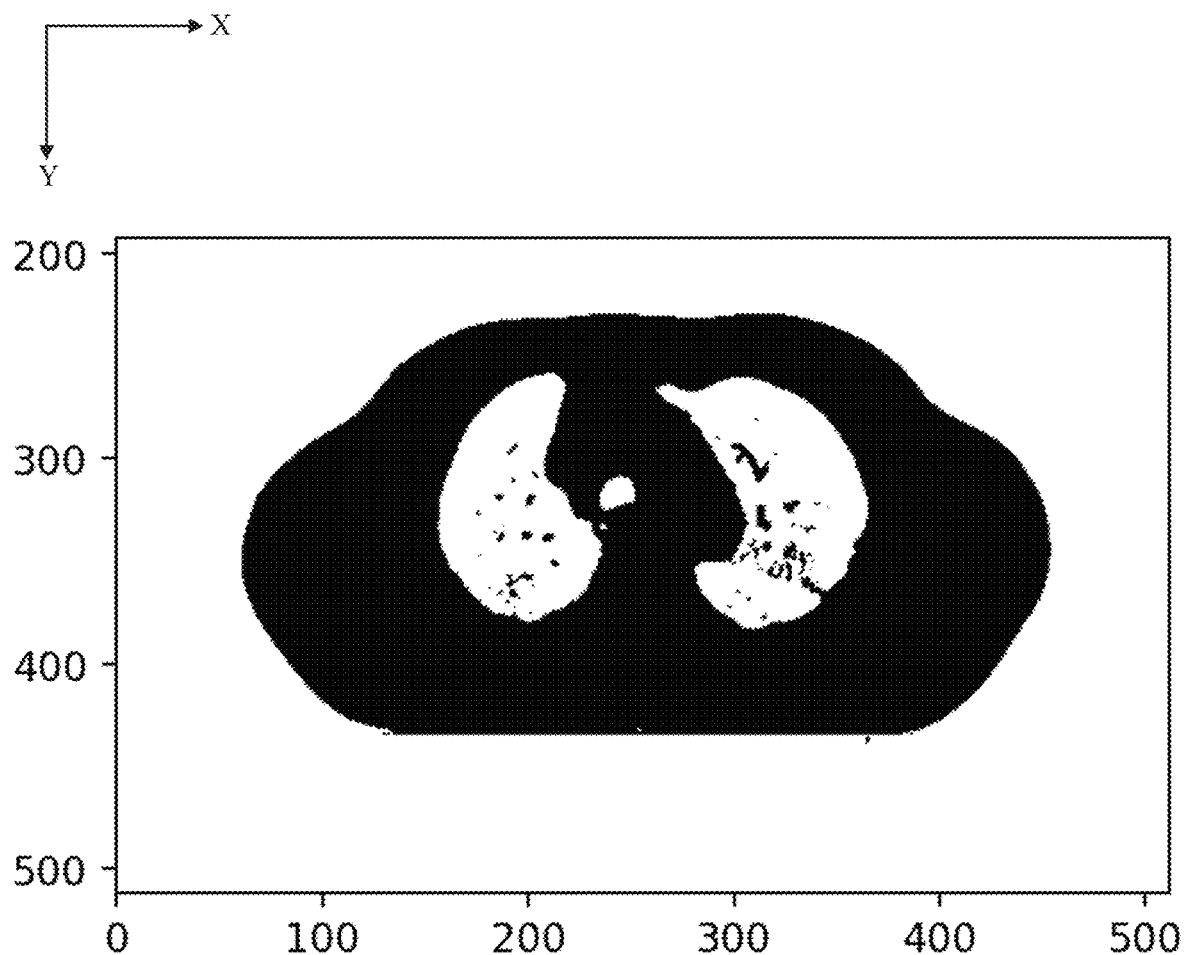
FIG. 3C shows a result of one single two-dimensional computed tomography (2D-CT) image after an automatic thresholding method is applied.
Figure 4A:
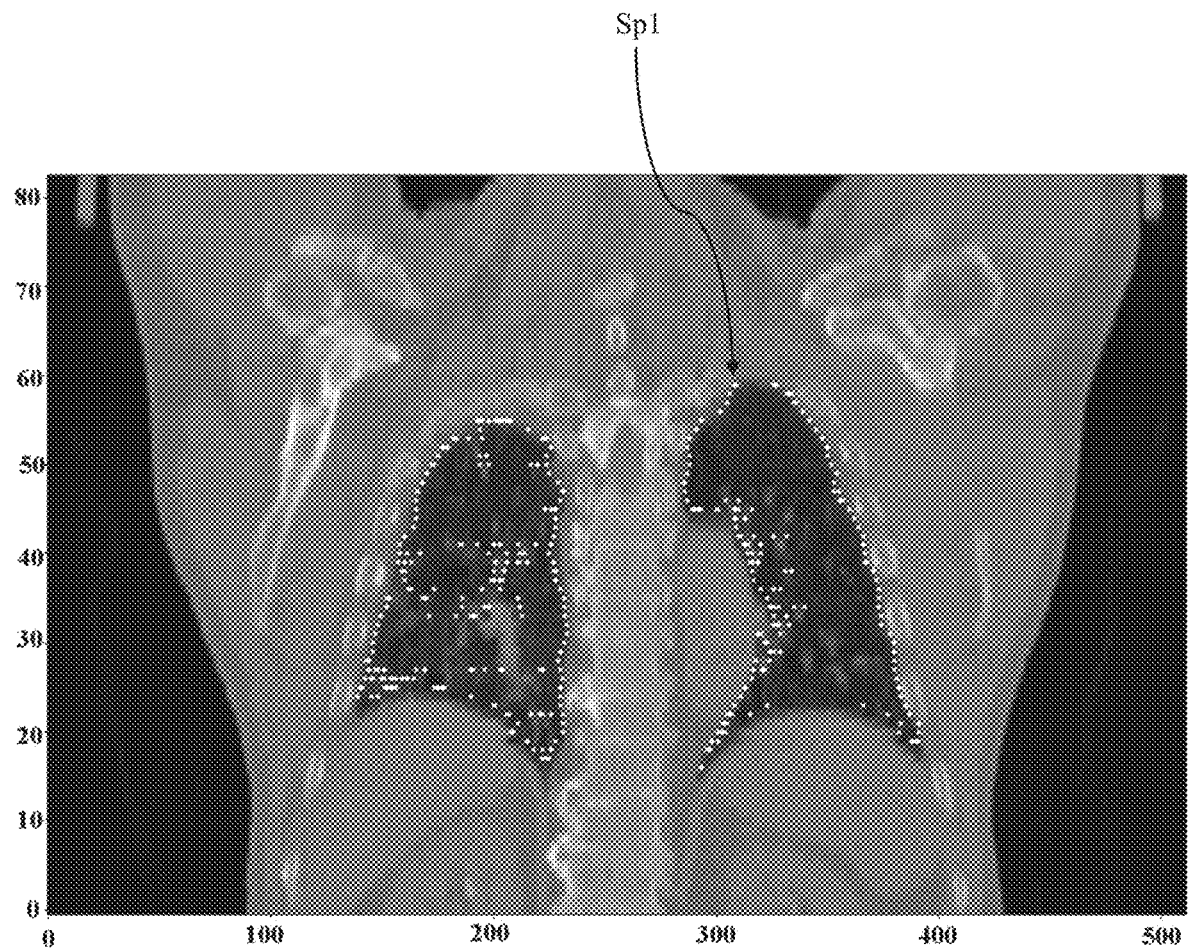
FIG. 4A shows first feature points of a maximum inhale phase on an X-Z plane, and their corresponding inner Hounsfield Unit (HU) distribution features.
Figure 4A:
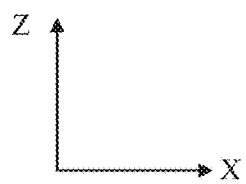
Figure 4B:
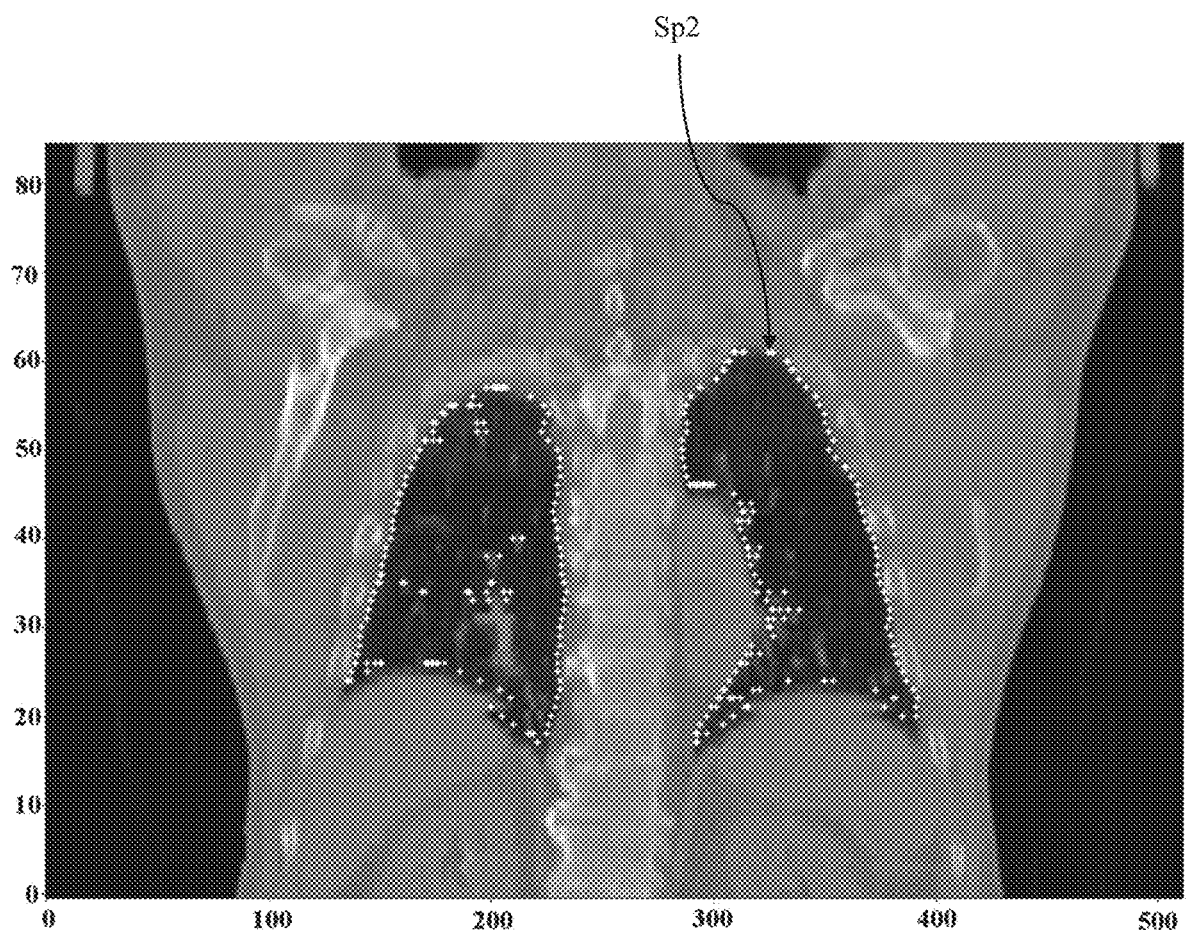
FIG. 4B shows second feature points of a maximum exhale phase on the X-Z plane, and their corresponding inner HU distribution features.
Figure 4C:
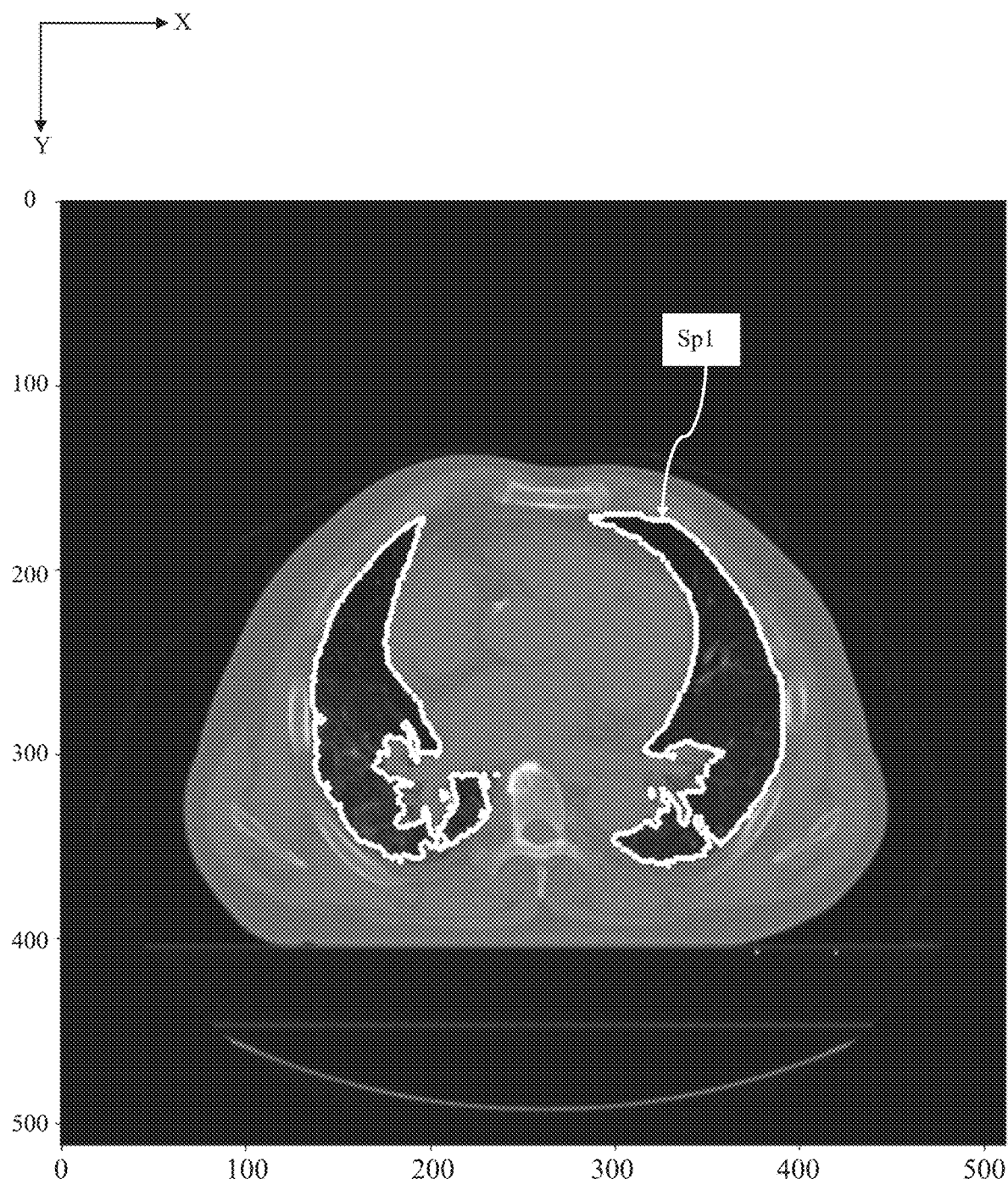
FIG. 4C shows first feature points of the maximum inhale phase on an X-Y plane, and their corresponding inner HU distribution features.
Figure 4D:
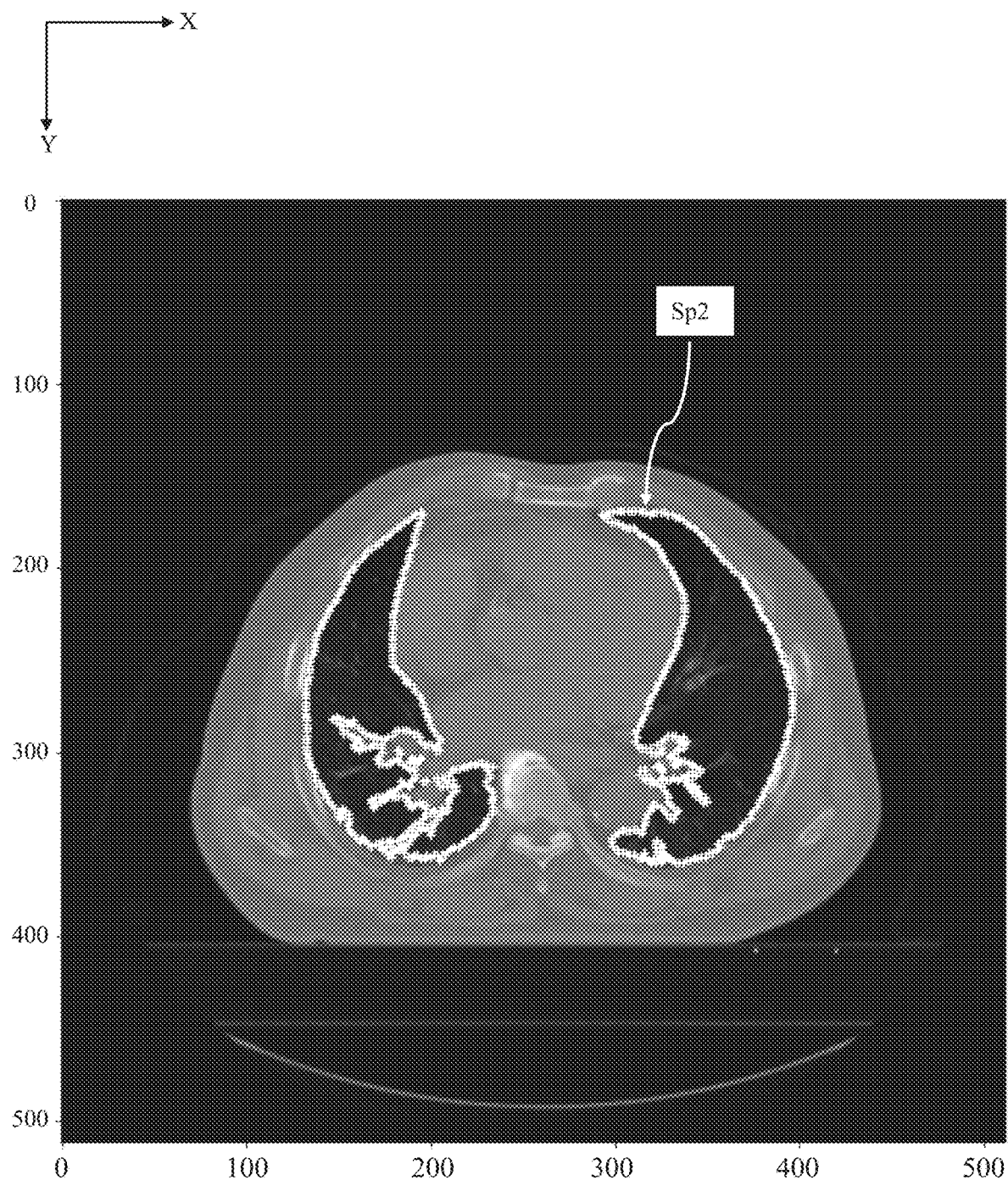
FIG. 4D shows second feature points of the maximum exhale phase on the X-Y plane, and their corresponding inner HU distribution features.

FIG. 3C shows a result of one single 2D-CT image after an automatic thresholding method is applied. To obtain the feature points, the boundary of the lung is firstly obtained according to several points each corresponding to one voxel in the 3D-CT image. In the chest CT image, the HU value of the lung approaches that of the air and is significantly different from those of other peripheral organ tissues, so the boundary can be easily extracted by a thresholding method. However, the HU values of the CT images change with different patients and different instrument's imaging parameters, so the automatic thresholding method (e.g., the method disclosed by Otsu in 1979) can be adopted to obtain a binary image. FIG. 3C shows a result of an example of the binary image obtained after the automatic thresholding method is applied. Therefore, the boundaries of the lung can be obtained according to horizontal sections of the first 3D-CT image and the second 3D-CT image using the boundary tracking technology, and can be stacked together to obtain the distributions of the 3D feature points (first feature points and second feature points), as shown in FIGS. 4A to 4D. In another example, the 3D boundary may also be generated according to the first 3D-CT image and the second 3D-CT image so that the 3D feature point distribution can be obtained. FIGS. 4A and 4B respectively show first feature points Sp1 (white dots) and second feature points Sp2 (white cross points), wherein there are more sampling points in FIGS. 4C and 4D, so it may be slightly difficult to distinguish the dots from the cross points, and only the highlight leadlines are used to mark the collections of the first feature points Sp1 and the second feature points Sp2. Therefore, referring to FIGS. 1 to 4D, feature point extraction can be performed in the step S02. For example, the first feature points Sp1 of the first 3D-CT image and the second feature points Sp2 of the second 3D-CT image are extracted.

It can be understood, from the nature of the human lung, that the deformations of the lung have two parts including the deformation of the boundary of the lung and the deformations of the inner tissues of the lung. The boundary of the lung is constrained by the neighboring organs (e.g., heart, trachea, parietal pleura and diaphragm). So, although such the deformations are consistent with the trends of deformations of the inner tissues of the lung, the actual deformation amounts of the inner tissues of the lung vary in a non-linear manner. In order to address the deformation phenomenon, the CPD point set registration is adopted to establish the deformation model. Regarding the deformations of the inner tissues of the lung, the Demons image registration method is adopted in this embodiment to establish the deformation model due to the similarity between the lung tissues and the viscous fluid movement. Therefore, this embodiment proposes a hybrid deformable image registration (DIR) method, which integrates the feature points and the image intensity information to establish the corresponding relationship between the maximum inhale phase and the maximum exhale phase of the 4D-CT image. The proposed hybrid DIR method integrates the CPD point set registration method and the Demons image registration method, wherein the CPD point set registration method is a boundary point set registration method. Of course, it is also possible to adopt other boundary point set registration methods, such as iterative closest point (ICP), robust point matching (RPM) and graph matching (GM) method. The Demons image registration method is an inner tissue registration method according to the Gaussian distribution. Of course, it is also possible to adopt another energy method, such as an optical flow method of analyzing the properties of the inner tissue distributions based on sum-squared-distance (SSD), cross-correlation (CC) or normalized cross-correlation (NCC), to perform the inner tissue registration.

In summary, it is obtained that image registration can be performed in the step S03. In one example, the first 3D-CT image is registered with the second 3D-CT image according to the first feature points and the second feature points serving as the boundary feature points using the boundary point set registration method and the inner tissue registration method, so that the first voxels (image units) Vo1 correspond to the second voxels (image units) Vo2 and the tissue units of the lung. The setting of the tissue units is not particularly restricted as long as the radiation therapy planning gets convenient. Therefore, the tissue units may be set as corresponding to the second voxels Vo2, which is also referred to as conversion points in a one-to-one manner, and the first voxels Vo1 are referred to as original points in this example. In another example, the tissue units may also be set as corresponding to the first voxels Vo1 in the one-to-one manner. In still another example, the tissue units may be set as associating with third voxels (not shown) different from the first voxels Vo1 and the second voxels Vo2. In the step of registering the first 3D-CT image with the second 3D-CT image, a first boundary of the lung in the first 3D-CT image and a second boundary of the lung in the second 3D-CT image are firstly determined according to the first feature points and the second feature points using the boundary point set registration method, and then registering of the inner tissues of the lung is performed according to the first boundary and the second boundary, and relationships between the HU values of the first voxels and the second voxels (e.g., the differences between the HU values) using the inner tissue registration method.

Referring to FIGS. 4A to 4D, the first feature points and the second feature points are extracted feature points, which are depicted in the original first 3D-CT image and second 3D-CT image. In the region enclosed by the boundary feature points, the inner tissue units (corresponding to 3D voxels or 2D pixels) of the lung have the corresponding HU values representative of the inner HU distribution features, as shown by the grayscale pixels in FIGS. 4A to 4D, when the Computed Tomography is performed. Thus, a CPD result including a changing vector field of boundary feature points (contour points) can be obtained after the CPD registering according to the boundary feature points. Then, Demons image registering is performed according to the CPD result in conjunction with multiple HU values of HU intensity distributions of the 3D-CT images. Comparisons are made to obtain the inner flow field deformations between the two phases (maximum inhale and exhale phases) according to the similar properties of the inner distribution patterns of the HU values. Thus, it is possible to obtain the boundary points of the two phases and two vector fields (inner deformation vector fields) of all inner points (tissue units). Then, the corresponding relationships between the first voxels and the second voxels are established according to the fact that two images corresponding to the two inner deformation vector fields pertain to the same region. Next, the changing HU values are compared to obtain the functional index values.

Figure 5A:
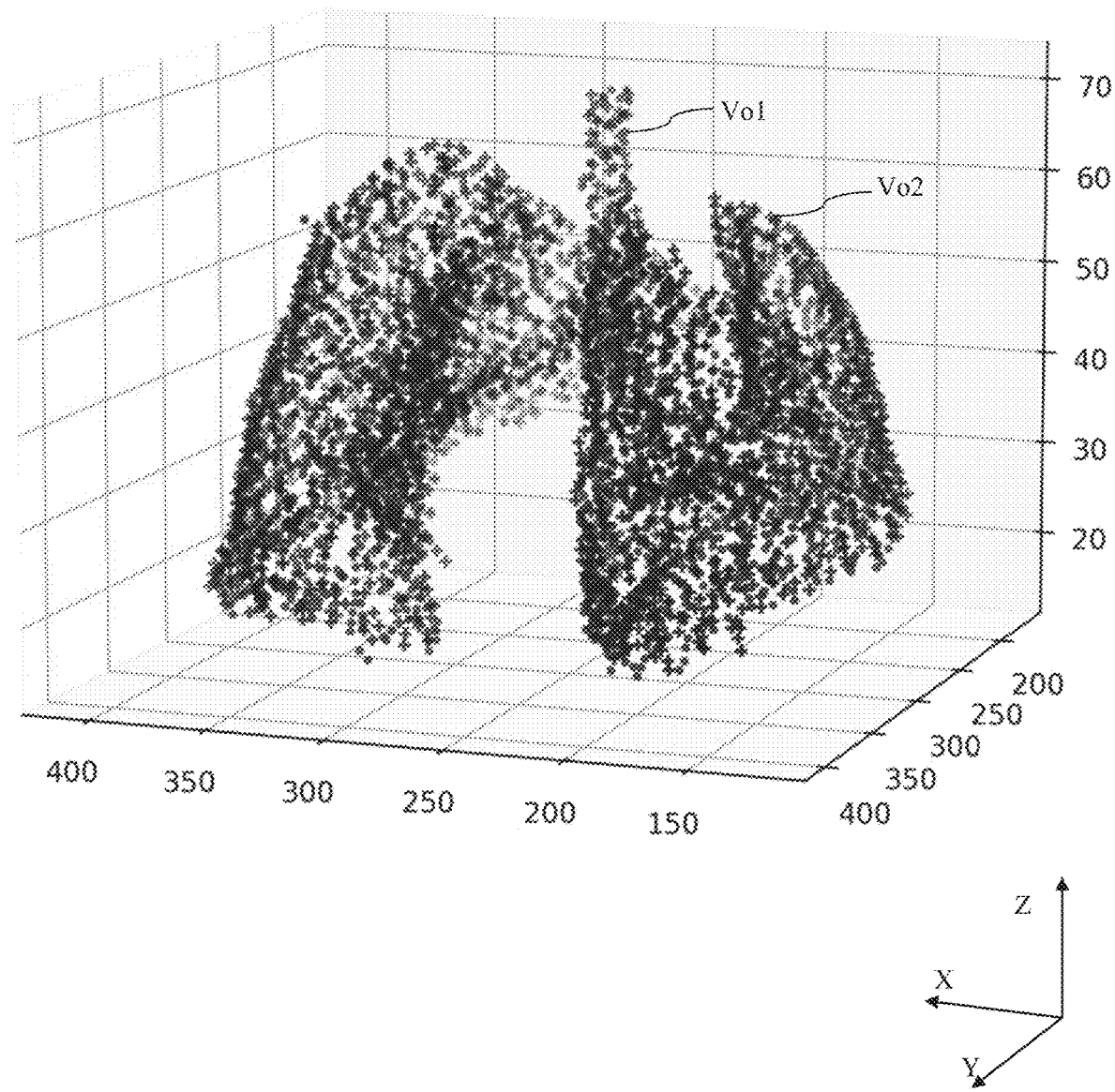
FIGS. 5A to 5C respectively show three iteration results after a CPD point set registration method is performed.
Figure 5B:
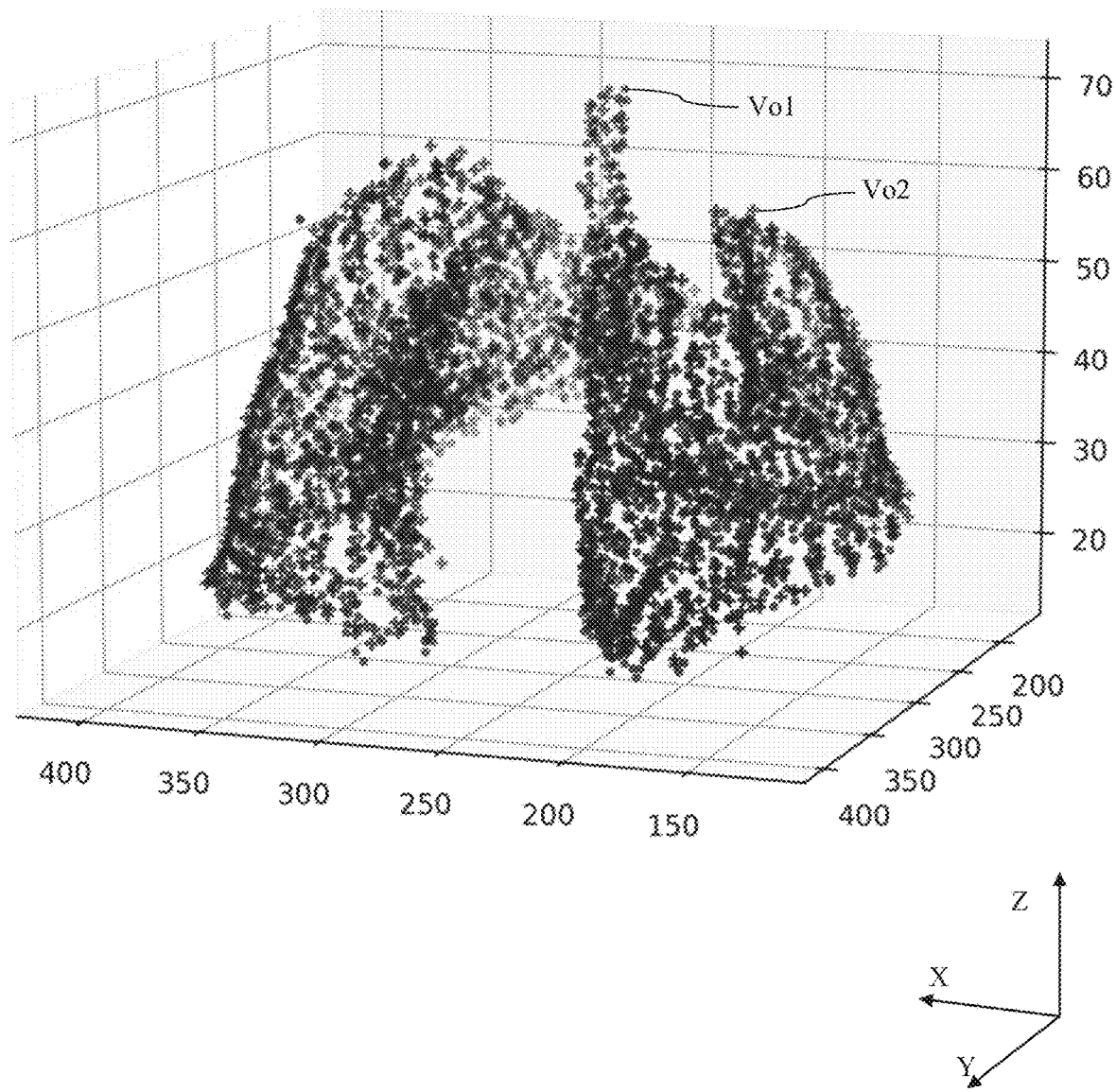
Figure 5C:
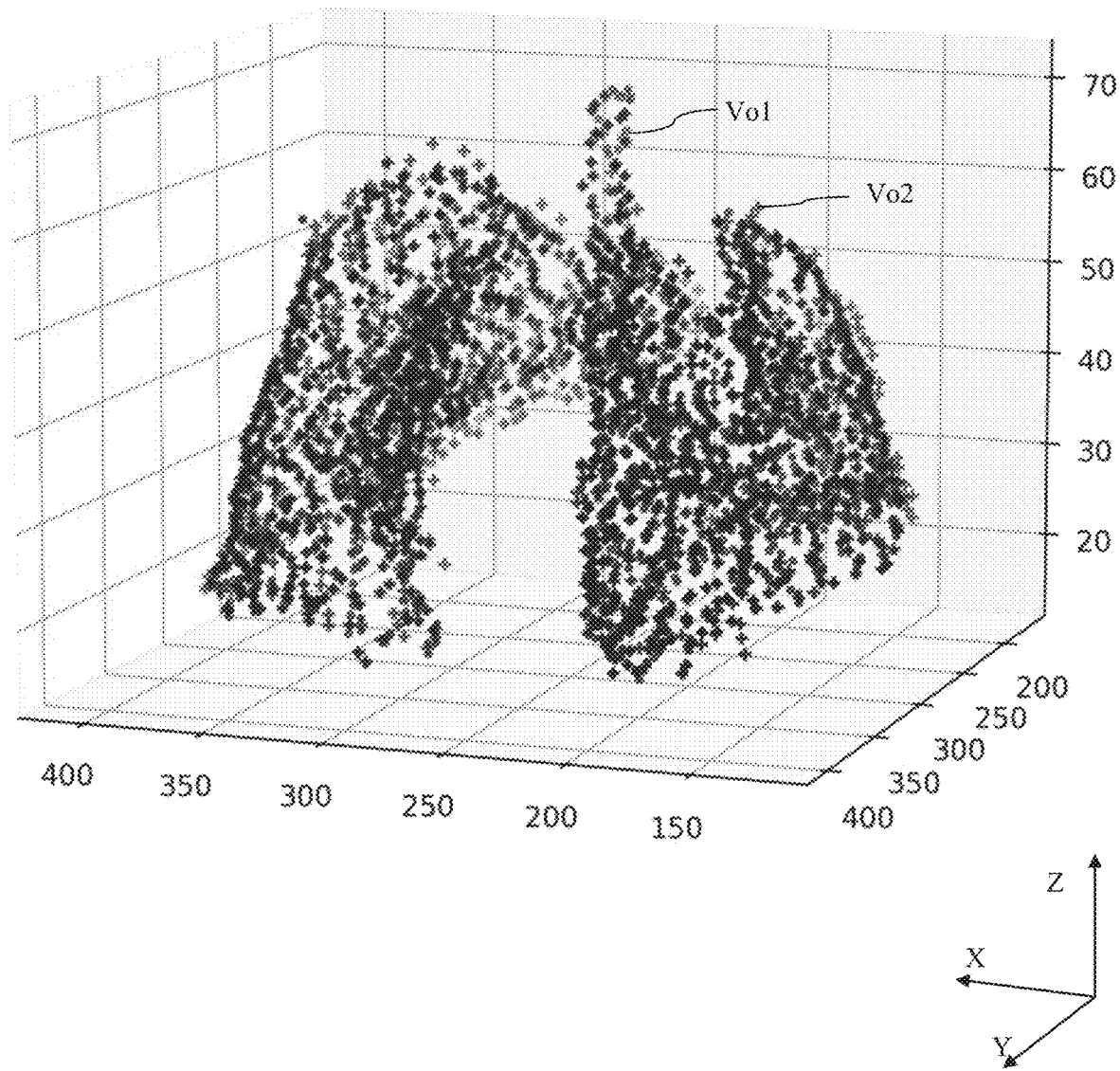

In addition, the deformation of the lung at the boundary is non-linear and anisotropic during respiration. Meanwhile, each voxel is used to define the feature point of the boundary of the 3D-CT image, and the points obtained from the maximum inhale phase and the maximum exhale phase may have different counts (numbers) but have the similar topology. Therefore, the CPD (Myorenko and Song in 2010) point set registration method is adopted in the first step of the hybrid DIR in this embodiment because the advantage thereof allows the point set registering of different numbers of points. The CPD method effectively addresses the registration by describing the proximity of one of the point sets with the Gaussian mixture model (GMM) and calculates the posteriori probability for each point in the point set with respect to another to determine the probability of the point being the same point in the other point set. The details of the CPD method can be understood by those skilled in the art, so detailed descriptions will be omitted. FIGS. 5A to 5C respectively show three iteration results after the CPD point set registration method is performed. FIG. 5A shows the result after the first iteration, wherein dots represent the first voxels Vo1 corresponding to FIG. 3A; and cross points represent the second voxels Vo2 corresponding to FIG. 3B. FIG. 5B shows the result, which is obtained after the 20th iteration and has not reached the converged state yet. FIG. 5C shows the result, which is obtained after the 36th iteration and has reached the converged state.

Figure 6:
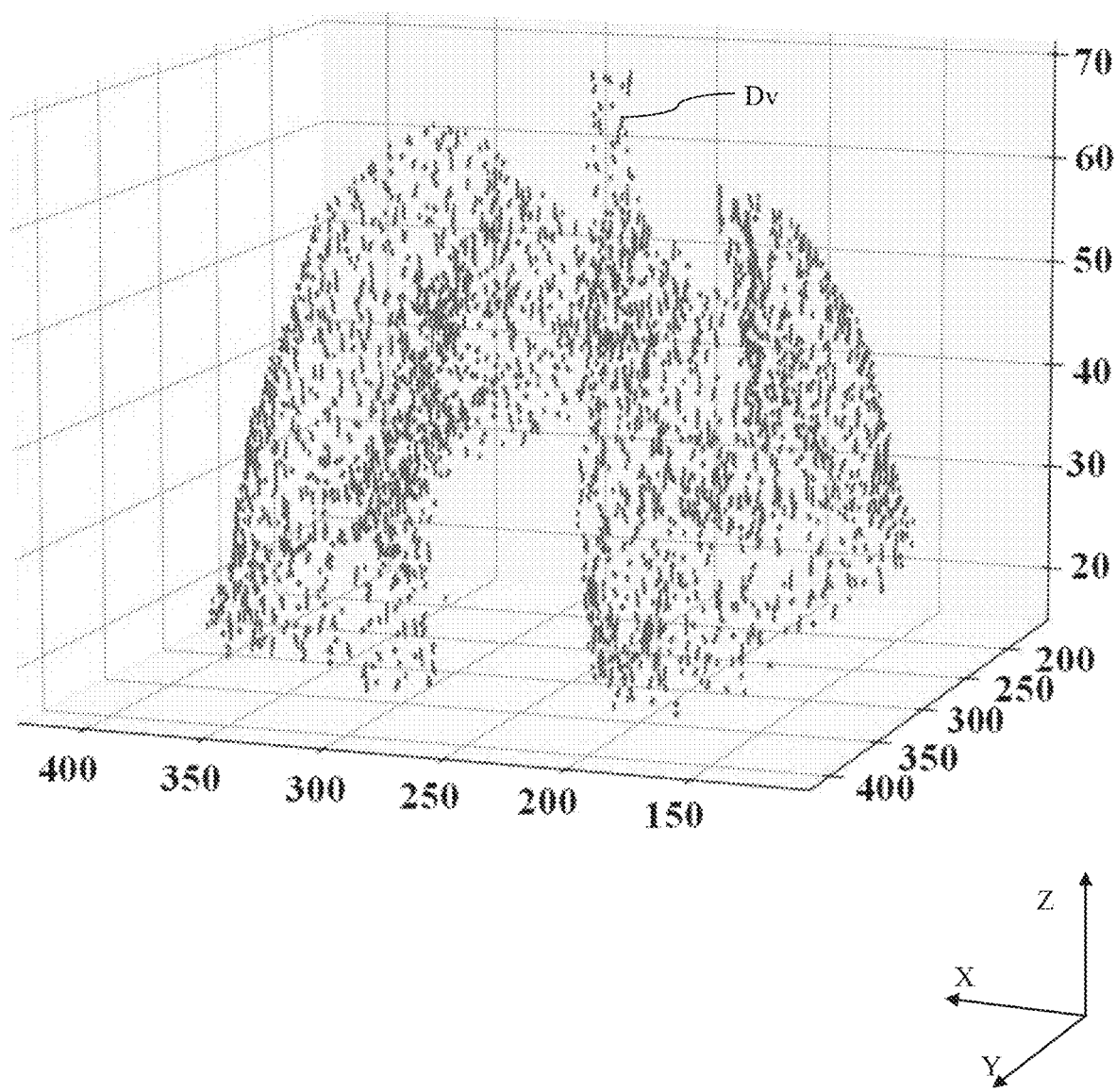
FIG. 6 shows a displacement vector field obtained.

In this embodiment, in order to reduce the computing costs, the number of points is reduced to (1/20). The X, Y and Z displacements of each point can be obtained by the position of the original point (e.g., the first feature point) minus the position of the conversion point (e.g., the second feature point). Then, the displacement vector field constituted by displacement vectors Dv of all points can be obtained, as shown in FIG. 6. Because the displacement vector field is only constituted by the mapping of the feature points of the contour, the inner displacement vectors of the boundary of the contour of the lung can be obtained by linear interpolation. The X, Y, Z components of the displacement vector field can be decomposed, and adopted to calculate the displacement vector within the lung. Then, the obtained displacement vector field can be configured as the initial displacement vector field used in the subsequent Demons image registration method.

The human lung is an elastic organ, and continuously deforms. Therefore, the obtained displacements should be constrained by elastic regularization to prevent the completely free deformation and keep the result valid. In order to establish the deformation model of the inner tissues of the lung, the Demons image registration method is adopted in the second step of the hybrid DIR. The Demons image registration method is an image registration method based on the optical flow model, which analyzes the continuous movement (flow) of objects in images similar to fluid dynamics, wherein the optical flow model indicates the mode of apparent movement of the object between two continuous images. Since the human lungs deform continuously in a manner similar to fluid movement in which the image intensities change slightly during respiration, the Demons image registration method is a good choice for the application. In practice, the Demons image registration method utilizes the gradient information of image intensities of the two images to register the two images with each other. The Demons image registration method is firstly proposed based on the analog of Maxwell's Demons in thermodynamics, and those skilled in the art may easily understand the details thereof, so detailed descriptions will be omitted.

Figure 7:
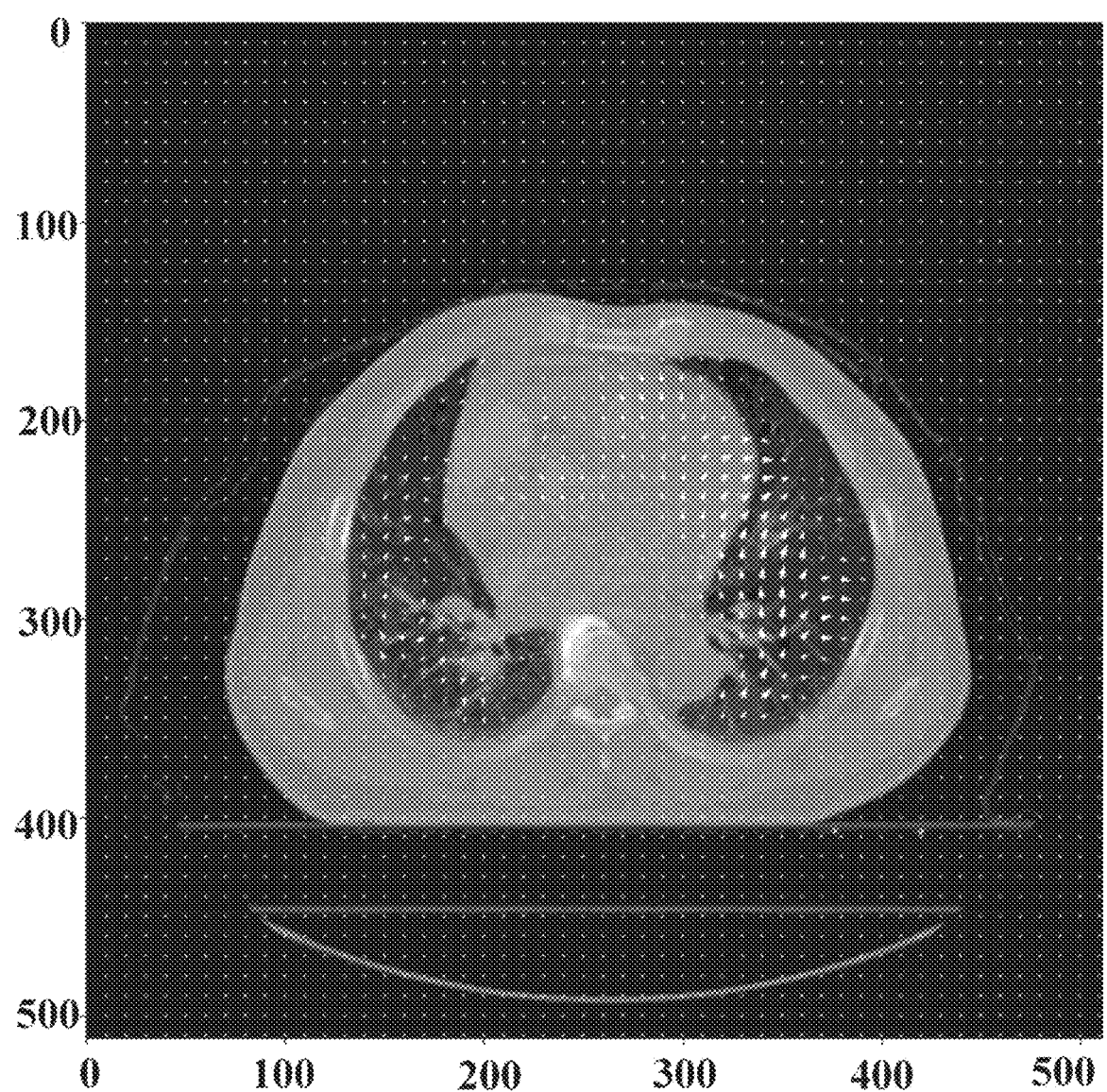
FIG. 7 shows a displacement vector field depicted in a CT image of the maximum inhale phase on the X-Y plane after hybrid image registering.
Figure 8:
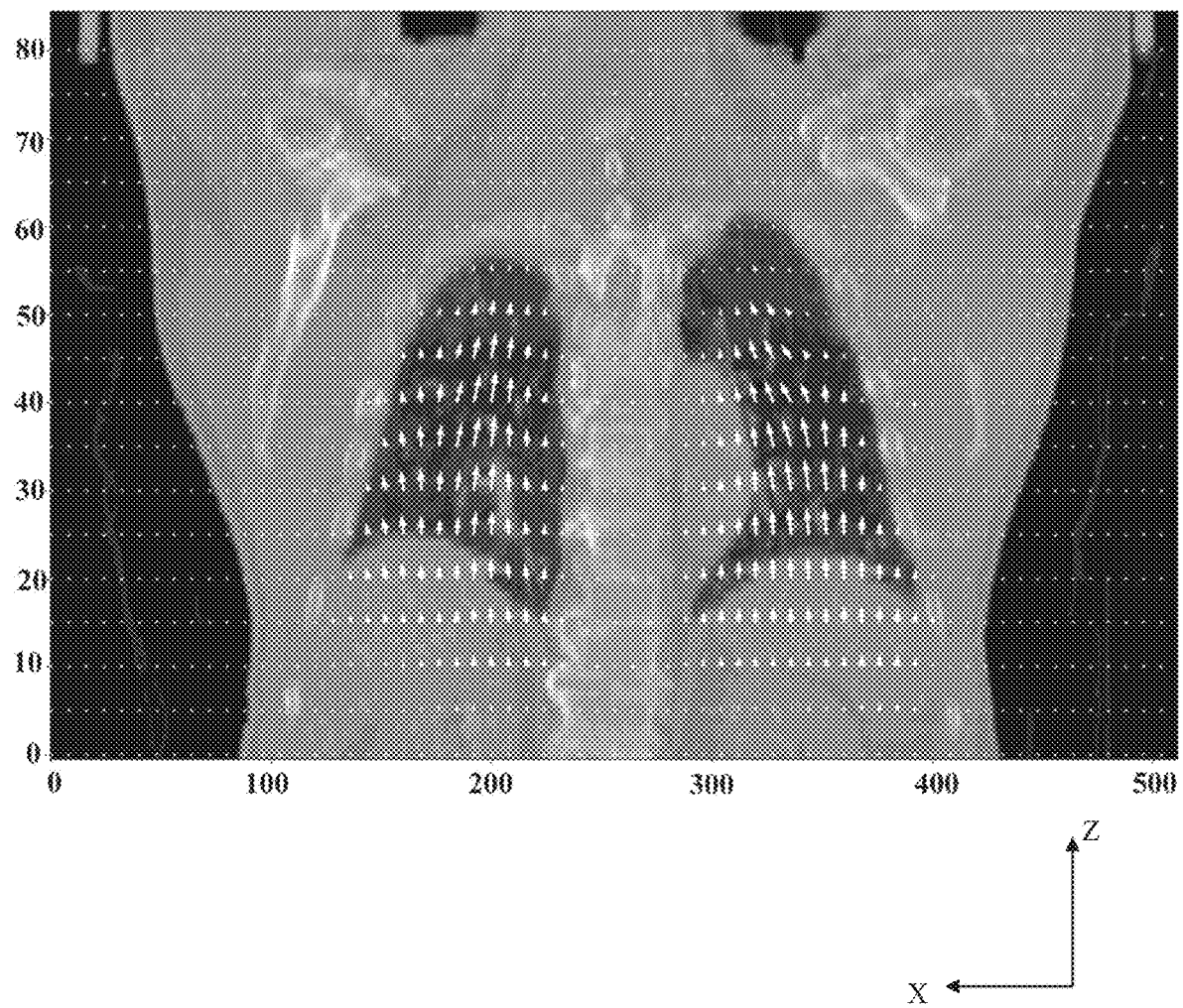
FIG. 8 shows a displacement vector field depicted in the CT image of the maximum inhale phase on the X-Z plane after hybrid image registering.

In this embodiment, convolution of the displacement vector field in each iteration is performed using Gaussian kernel with standard deviation of 2.0. FIG. 7 shows a displacement vector field (white arrow marks) depicted in a CT image of the maximum inhale phase on the X-Y plane after hybrid image registering. FIG. 8 shows a displacement vector field (white arrow marks) depicted in the CT image of the maximum inhale phase on the X-Z plane after hybrid image registering. It is worth noting that the small white dots in FIGS. 7 and 8 indicate that the arrows degenerate into parts without displacement. Referring to FIGS. 7 and 8, the displacement vector field describes the transformation of voxels from the maximum inhale (moving) 3D image to the maximum exhale (target) 3D image. It can be seen that the displacement vector field conforms with the deformation direction of lungs during the exhale process.

Next, the pulmonary function analysis can be performed in the step S04, wherein the functional index values representative of the tissue units of the lung(s) can be determined according to the first voxels and the second voxels corresponding to the first voxels using a functional index value quantification method, such as the ventilation function quantification method. This step can be implemented using the ventilation function quantification method. After the registering of the 3D-CT images of the maximum inhale and exhale phases, the corresponding relationships between the same lung tissues can be obtained. Due to the fact that the density of lung tissue changes during respiration because of increased perfusion, the HU value needs to be corrected. Then, the HU difference between the same lung tissues can be obtained and quantified for ventilation status of the lung, as expressed by Equation 1.

$$V_{4DCT}^{HU}(x, y, z) = \frac{HU_{ex}(x, y, z) - HU_{in}\{x + u_x(x, y, z), y + u_y(x, y, z), z + u_z(x, y, z)\}}{HU_{in}\{x + u_x(x, y, z), y + u_y(x, y, z), z + u_z(x, y, z)\}} \rho_{scaling}$$

Equation 1

Figure 9:
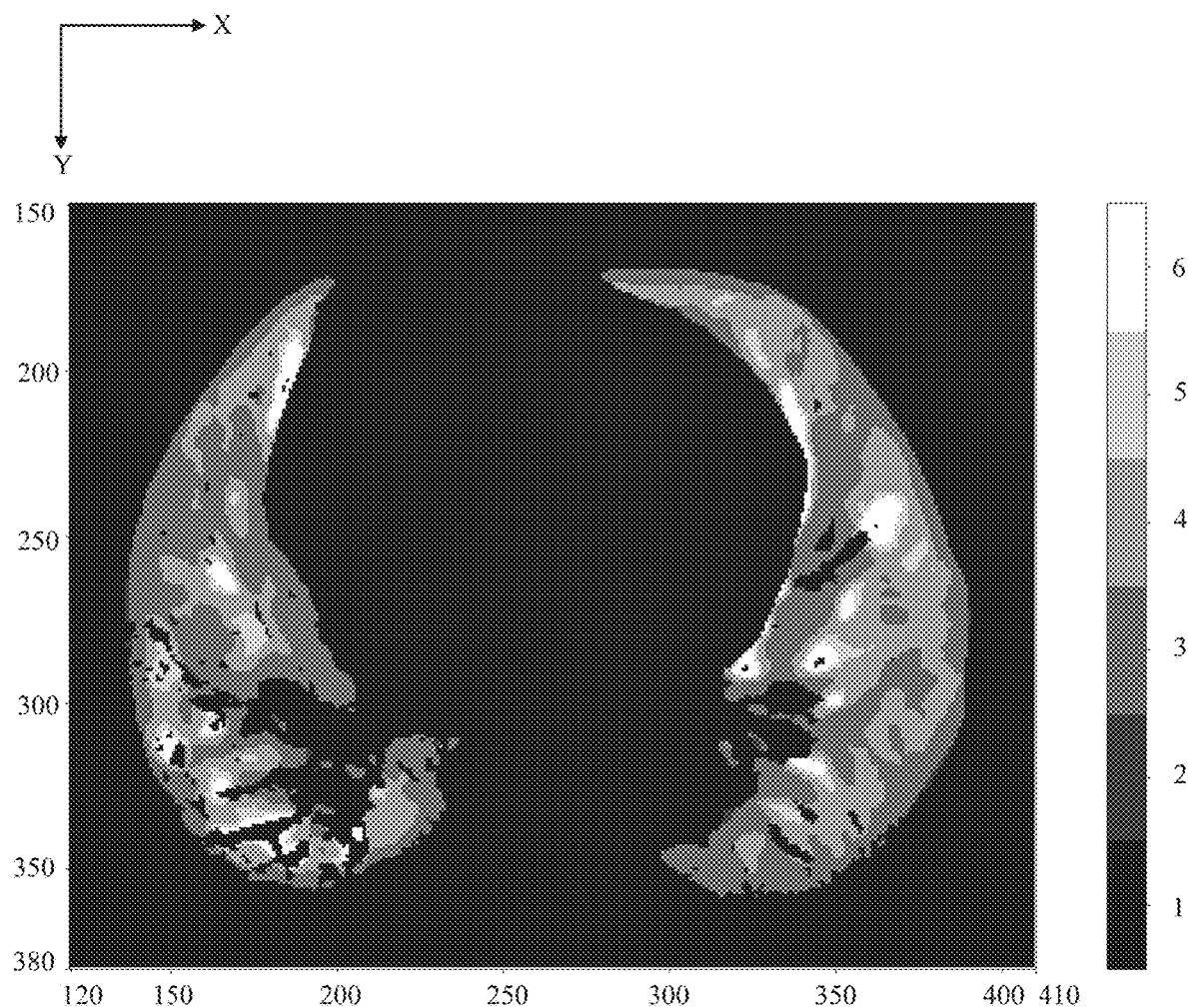
FIG. 9 shows a ventilation functional map of lung tissues classified into six levels on one single X-Y plane.

In Equation 1, $V_{4DCT}^{HU}(x, y, z)$ represents the ventilation metric (index) of the lung tissue for a voxel (e.g., based on the first voxel of the maximum inhale phase) at coordinates (x, y, z), $\rho_{scaling}$ represents the CT density scaling factor, $HU_{ex}$ and $HU_{in}$ represent the HU values of the lung tissues of the CT images of the maximum exhale and maximum inhale phases, and $u_x$, $u_y$, $u_z$ represent the displacement vector field of a voxel at coordinates (x, y, z). However, in Equation 1, singularities might occur at some range, resulting in several local extrema. After removing the extrema and negatives from the ventilation map, the majority of the function variable lies in the range of 0 to 1297, in which the ventilation functional map exhibits a discrete nature and is not suitable for the implementation in functional avoidance radiation therapy. In other words, the irradiation parameter of the radiation therapy cannot be optimized in a way that avoids highly functional lung regions. According to the requirements of the currently clinical radiation radiologists, it is appropriate to classify the ventilation metric values into several levels. In addition, the computed ventilation metric varies between patients, so a classification method should be used to differentiate the functional levels. In this embodiment, ventilation functions of the tissue units of the lung are classified into two or more levels (e.g., six levels) according to a mean and a standard deviation of ventilation metrics to obtain several levels of regions. Therefore, the pulmonary function identifying method of this embodiment may further include classifying the tissue units into multiple levels of regions according to the functional index values. The classification result of six levels is depicted in FIG. 9. In FIG.

9, the brighter part represents the lung tissue having the better function (ventilation function), the darker part represents the lung tissue having the worse function, and most black parts indicate the tissues, which are located outside the lungs and have no ventilation function, wherein the corresponding grayscale parts have the ventilation metric values ranging from 1 to 6.

Figure 10:
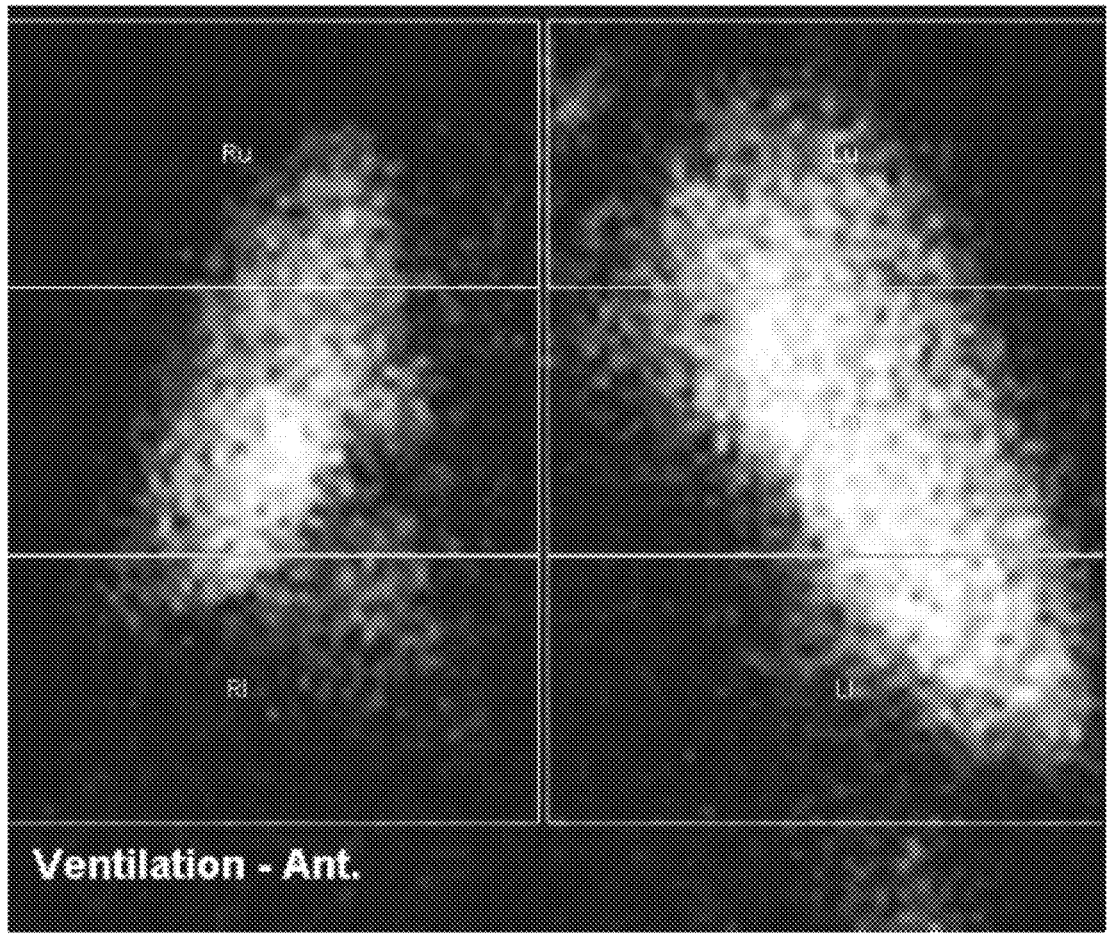
FIGS. 10 and 11 show ventilation maps obtained using a nuclear medicine lung ventilation examination and the pulmonary function identifying method of this embodiment, respectively.
Figure 11:
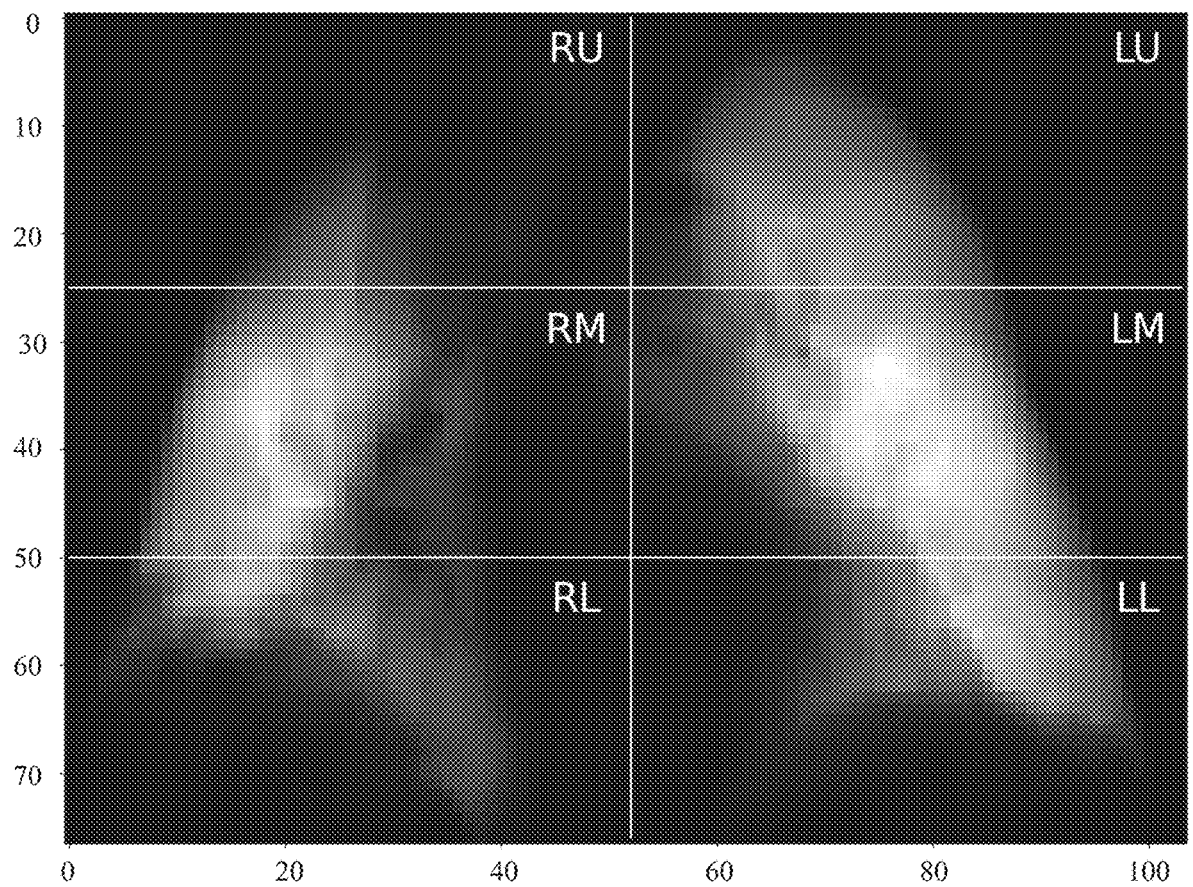
Figure 11:
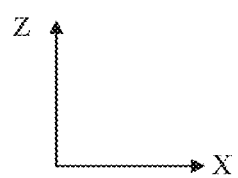

FIGS. 10 and 11 show ventilation maps obtained using a nuclear medicine lung ventilation examination and a pulmonary function identifying method of this embodiment, respectively. In the following, the ventilation analysis result of this embodiment is compared with the ventilation examination result of the conventional nuclear medicine. According to the conventional nuclear medicine lung ventilation examination, the intensity signals positively correlating with ventilation values are obtained using a sensor placed on the patient's anterior and posterior coronal plane, as shown in FIG. 10. On the other hand, the result obtained by stacking the ventilation functional maps of this embodiment in the Z-axis direction is shown in FIG. 11. Table 1 lists the intensity percentages of six regions of FIGS. 10 and 11, and the correlation coefficients. FIGS. 10 and 11 refer to the ventilation map of the same patient.

TABLE 1

|  | Intensity percentage (%) | | |
| --- | --- | --- | --- |
|  | Nuclear medicine lung ventilation examination | This embodiment (4D-CT) | Correlation coefficient |
| Right upper lung (RU) | 7.6 | 3.9 | 0.80 |
| Right middle lung (RM) | 19.5 | 23.2 | 0.84 |
| Right lower lung (RL) | 7.1 | 12.3 | 0.65 |
| Left upper lung (LU) | 14.4 | 12.8 | 0.89 |
| Left middle lung (LM) | 33.5 | 32.2 | 0.87 |
| Left lower lung (LL) | 17.9 | 15.6 | 0.89 |

It is understood, from Table 1, that the ventilation functional map obtained from the 4D-CT image conforms to the ventilation map obtained from the nuclear medicine lung ventilation examination, where the error between the regions of the two functional maps varies from −5.2% to 3.7%, and the maximum error occurs in the right lower lung. In contrast, the results of the proposed hybrid DIR method are affected by the large deformation of pleura but show satisfactory accuracy for ventilation function analysis. According to the research of Veiga et al in 2014 (Toward adaptive radiotherapy for head and neck patients: Feasibility study on using CT-to-CBCT deformable registration for "dose of the day" calculations), the dose difference is lower than 2% if the accuracy of the DIR method reaches a resolution of 2 mm and is acceptable clinically, in which the mean of error of the DIR method of this embodiment achieves. Therefore, the ventilation analysis results of this embodiment reach the clinical standards of DIR specification.

It is worth noting that although the DIR method is adopted to explain how to obtain the functional index values according to the CT image(s), this disclosure is not restricted thereto. In other examples, the functional index values may also be obtained according to magnetic resonance (MR) image(s) obtained by the magnetic resonance imaging (MRI) examination or CT image(s) obtained by dual energy computed tomography (DECT). In MRI, the examinee inhales the mixed gas of xenon isotopes to obtain a first MR image of the first state corresponding to the 3D ventilation function, and additionally inhales the general air to obtain a second MR image of the second state corresponding to the 3D lung anatomy. Using the feature point extraction method, the point set registration method and the image registration method of this disclosure to register the two MR images with each other can determine the xenon signal intensity distribution in each lobar region. The xenon gas mixture concentration of each lobe is determined according to the ventilation MR images to identify the ventilation functionality of each lobe. In DECT, the examinee inhales the xenon and is then subjected to the DECT scan. Dual-energy CT images, which may also be regarded as images obtained in different states at each time instant, are obtained at different time instants before, during and after inhaling. The compositions of air, soft tissue and xenon in the image can be distinguished according to the property that the substances have different X-ray attenuation coefficients for two energies. The HU values corresponding to air, soft tissue and xenon can be estimated by reverse derivation using the optimal solution according to the feature point extracting method, the point set registration method and the image registration method of this disclosure, so that the ratio of air, soft tissue and xenon in each region of the image can be calculated. Finally, the pulmonary function index values are determined according to the concentration distribution of xenon in the lung.

In addition, the nuclear medicine lung ventilation examination utilizes the single photon emission computed tomography (SPECT) to examine the quantity (signal) value of gamma rays released from the 3D radioactive contrast agent. When an evaluation report is made by the nuclear medicine department, the horizontal section is partitioned into regions, and the signal statistic values are read therefrom. Therefore, the ventilation information from the conventional nuclear medicine pulmonary function examination report provides only the deterministic rough ventilation classification of the horizontal section (X-Y plane, anterior and posterior), so that the higher resolution of ventilation map cannot be obtained. With this embodiment, the radiation therapy planning can be adjusted with the higher resolution.

With the pulmonary function identifying method of the embodiment, the functional index values representative of the tissue units of the lung are determined according to CT or MR images using, for example, the deformable image registration method and the pulmonary ventilation functional analysis method. Therefore, the patient is free from the radiation dosage for the nuclear medicine pulmonary function examination, and the result with the resolution higher than that of the nuclear medicine pulmonary function examination can be obtained for radiation therapy planning.

The specific embodiments proposed in the detailed description of this disclosure are only used to facilitate the description of the technical contents of this disclosure, and do not narrowly limit this disclosure to the above-mentioned embodiments. Various changes of implementations made without departing from the spirit of this disclosure and the scope of the claims are deemed as falling within the following claims.

What is claimed is:

1. A pulmonary function identifying and treating method, comprising, in order, steps of:
obtaining, by a scanner, a first image of a patient, having first image elements, and a second image of the patient, having second image elements, respectively corresponding to a first state and a second state of a lung of the patient;
receiving, by a computer, the first image and the second image and extracting, by the computer, first feature points of the first image and second feature points of the second image, wherein a count of the first feature points is different from a count of the second feature points, the first feature points are located around and inside the first image, and the second feature points are located around and inside the second image;

registering, by the computer, the first image with the second image using a boundary point set registration method and an inner tissue registration method according to the first feature points and the second feature points, so that the first image elements correspond to the second image elements and tissue units of the lung;

determining, by the computer, functional index values representative of the tissue units of the lung using a ventilation function quantification method according to the first image elements and the second image elements corresponding to the first image elements;

performing, by the computer, radiation therapy planning according to the functional index values to obtain radiation therapy planning data;

receiving, by a radiation therapy apparatus, the radiation therapy planning data; and treating the patient by the radiation therapy apparatus according to the radiation therapy planning data, wherein:

the boundary point set registration method is a coherent point drift (CPD) point set registration method, and the inner tissue registration method is a Demons image registration method utilizing gradient information of image intensities of the first image and the second image to register the first image and the second image with each other; and a displacement vector field is obtained using the CPD point set registration method, and the displacement vector field is configured to an initial displacement vector field used in the Demons image registration method.

2. The pulmonary function identifying and treating method according to claim 1, wherein:

the first image is a first three-dimensional computed tomography (3D-CT) image, and the second image is a second 3D-CT image; or the first image is a first two-dimensional computed tomography (2D-CT) image, and the second image is a second 2D-CT image.

3. The pulmonary function identifying and treating method according to claim 2, further comprising a step of:

obtaining the first 3D-CT image and the second 3D-CT image according to a four-dimensional computed tomography (4D-CT) image of the lung, wherein the first 3D-CT image corresponds to a maximum inhale phase of the lung, and the second 3D-CT image corresponds to a maximum exhale phase of the lung.

4. The pulmonary function identifying and treating method according to claim 2, wherein in the step of registering the first 3D-CT image with the second 3D-CT image, a first boundary of the lung in the first 3D-CT image and a second boundary of the lung in the second 3D-CT image are firstly determined according to the first feature points and the second feature points using the boundary point set registration method, and then registering of inner tissues of the lung is performed according to the first boundary, the second boundary and relationships between Hounsfield unit (HU) values of the first image elements and the second image elements using the inner tissue registration method.

5. The pulmonary function identifying and treating method according to claim 2, further comprising a step of: classifying the tissue units into multiple levels of regions according to the functional index values.

6. The pulmonary function identifying and treating method according to claim 5, further comprising: obtaining ventilation functions of the tissue units, based on the ventilation function quantification method, being functional index values representative of the tissue units, wherein the ventilation functions of the tissue units are classified into at least two levels according to a mean and a standard deviation of ventilation metrics to obtain the levels of regions.

7. The pulmonary function identifying and treating method according to claim 1, wherein the tissue units are set as corresponding to the second image elements in a one-to-one manner.

8. The pulmonary function identifying and treating method according to claim 2, wherein boundary tracking technology is adopted to obtain boundaries of the lung in multiple horizontal sections of the first 3D-CT image and the second 3D-CT image, and the boundaries are stacked together to obtain the first feature points and the second feature points.

9. The pulmonary function identifying and treating method according to claim 2, wherein boundary tracking technology is adopted to generate a 3D boundary to obtain the first feature points and the second feature points according to the first 3D-CT image and the second 3D-CT image.

10. The pulmonary function identifying and treating method according to claim 2, wherein after the CPD point set registration method is performed with the first feature points and the second feature points serving as boundary feature points to obtain a CPD result comprising a changing vector field of the boundary feature points, the Demons image registration method is performed according to the CPD result in conjunction with multiple Hounsfield Unit (HU) values of HU intensity distributions of the first 3D-CT image and the second 3D-CT image, wherein comparisons of the HU values are performed to obtain inner flow field deformations between the first state and the second state and to obtain two inner deformation vector fields, according to which corresponding relationships between the first image elements and the second image elements are established.

11. The pulmonary function identifying and treating method according to claim 1, wherein the first image and the second image are magnetic resonance images obtained using magnetic resonance imaging (MRI) examination, or computed tomography (CT) images obtained using dual energy computed tomography.

12. The pulmonary function identifying and treating method according to claim 1, wherein the Demons image registration method is adopted to constrain obtained displacements by elastic regularization.

* * * * *